July 27, 1937.
B. S. AIKMAN
2,088,274
MAGNETIC TRACK BRAKE
Filed Oct. 15, 1936
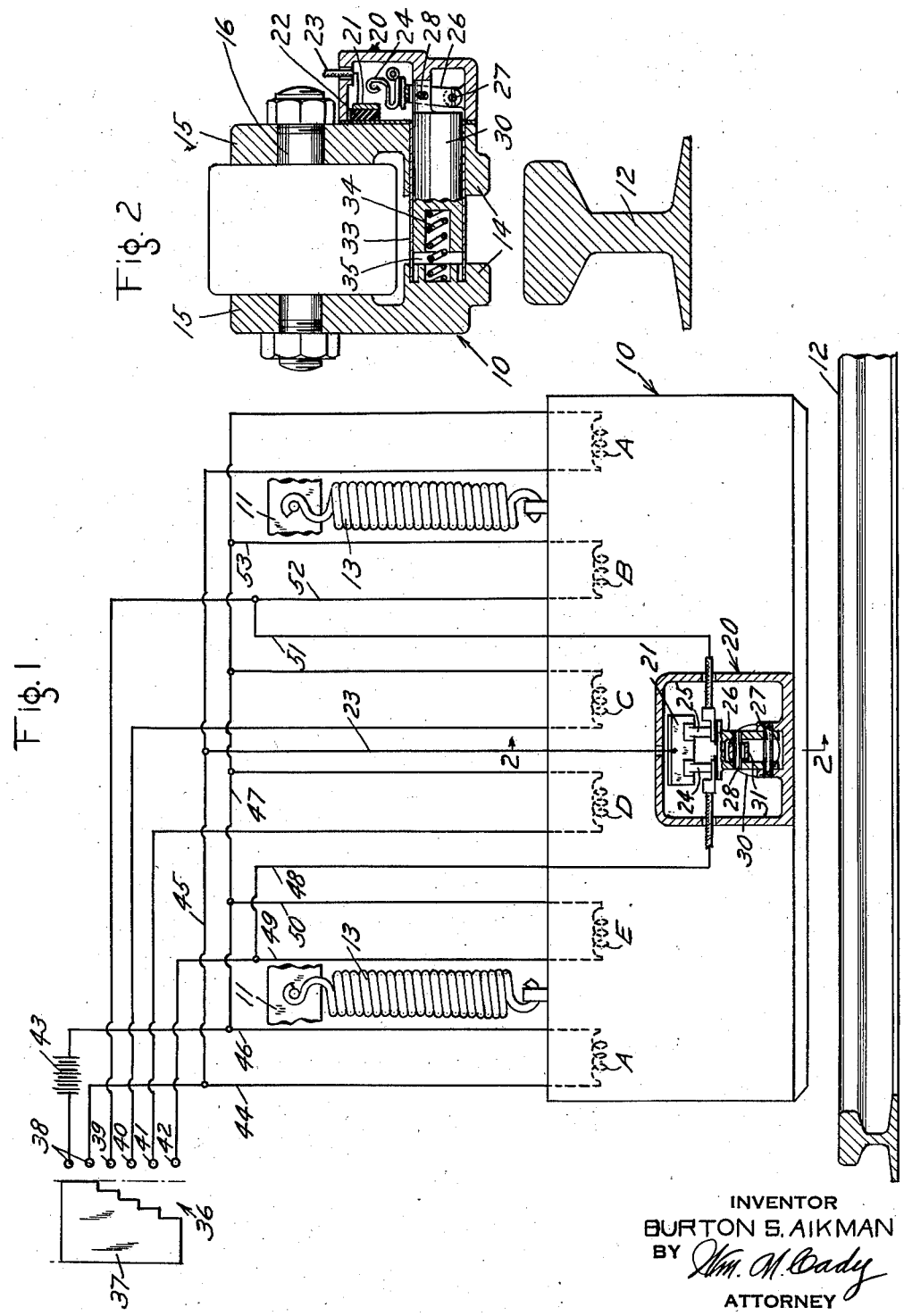
INVENTOR
BURTON S. AIKMAN
BY
Wm. M. Cady
ATTORNEY Patented July 27, 1937

2,088,274

UNITED STATES PATENT OFFICE 2,088,274

MAGNETIC TRACK BRAKE

Burton S. Aikman, Wilkinsburg, Pa., assignor to The Westinghouse Air Brake Company, Wilmerding, Pa., a corporation of Pennsylvania Application October 15, 1936, Serial No. 105,635

10 Claims. (Cl. 188—165)

This invention relates to magnetic track brakes, and more particularly to magnetic track brakes for railway trains and traction vehicles.

When magnetic track brake devices are suspended from a vehicle truck by springs, to be attracted to a track rail by virtue of its own magnetism, the degree of energization of the track brake winding required to effect the engagement with the track rail may be so high that when the track brake device engages the rail severe shock may be produced in the vehicle, thus causing discomfort to the passengers. This situation may be aggravated when the rail-engaging shoes of the track brake device become worn, and the distance between the shoes and the rail, in the suspended position of the track brake device, is as a result greater than normally desired, thus requiring a much higher degree of initial energization to cause attraction to the rail.

It is desirable that when a high degree of energization of a track brake device is required to cause it to engage the track rail by virtue of its own magnetism, the degree of energization be reduced just prior to engagement of the device with the track rail, so that the initial degree of braking will be at a relatively low value, in order that smooth initial deceleration will be produced. A principal object of the present invention is to provide a magnetic track brake system in which a high initial degree of energization may be employed to cause the track brake device to be attracted toward a track rail, but as the track brake device approaches the rail, and before engagement therewith, the degree of energization of the track brake device is automatically reduced to a value such that little or no shock to the vehicle will result.

A more specific object of the present invention is to provide a magnetic track brake device in which means operating according to leakage magnetic flux within the track brake device controls the degree of current supplied to the track brake device.

Further objects and advantages of the invention will be apparent from the following description, which is taken in connection with the attached drawing, wherein, Fig. 1 shows in schematic and diagrammatic form a particular embodiment of the invention.

Fig. 2 shows in cross-section a view along line 2—2 of the track brake device shown in Fig. 1.

Referring now to the drawing, I have indicated a single track brake device by the numeral 10, as comprising a plurality of windings A, B, C, D and E. The track brake device is intended to be normally suspended from a vehicle truck, indicated by the fragmentary construction 11, above a track rail 12, by suspension springs 13. The track brake device is preferably of the parallel shoe type, that is, having two rail-engaging shoes 14 disposed in parallel relationship longitudinally of the track rail 12. The energizing windings may be arranged in any suitable way upon a core held in place between two side plates 15 by a bolt 16. For example, the energizing windings may be arranged in concentric relationship, end-to-end relationship, or in any of the other well known relationships commonly employed in electrical brakes of this type.

Forming a part of the magnetic track brake device is a switch mechanism indicated at 20. This mechanism comprises a stationary contact 21 secured to an insulating block 22 attached to the track brake device. A conductor 23 leads to the contact 21. Two movable contacts 24 and 25 are carried by and insulated from a bifurcated rocking member 26, pivotally mounted at 27 to the frame, and also pivotally mounted at 28 to a magnetic plunger 30. The plunger 30 is provided with a lug 31 for connection to the rocking member 26.

The plunger 30 is also slidable in a non-magnetic tube 33, preferably of brass or copper, and is urged to the right by a spring 34. As will be seen clearly from Fig. 2, the nonmagnetic tube 33 extends laterally of the two rail-engaging shoes 14, and when the plunger 30 is positioned therein to the right, as shown, a small gap 35 is formed between the left end of the plunger and the left hand rail engaging shoe 14. In this position of the plunger the two contacts 24 and 25 are out of engagement with the one contact 21.

Referring now particularly to the control arrangement shown in Fig. 1, a controller shown generally at 36 is provided for controlling the energization of the several windings A, B, C, D, and E. This controller is preferably of the drum type, comprising a contact drum 37 which in a first application position engages and bridges two stationary contact fingers 38, and thereafter may be moved to other positions to sequentially engage stationary contact fingers 39 to 42 inclusive. A battery 43 is shown as a source of current supply, but obviously any other source could be just as well employed.

In operation, when the controller 36 is in the release position, as illustrated, the suspension springs 13 maintain the track brake device 10 suspended above the track rail 12 at some desired distance. When thus suspended, the spring 34 of the switch mechanism will act upon the plunger 30 to hold it in its right hand position, thus maintaining the two contacts 24 and 25 out of contact with the contact 21.

When the magnetic track brake is to be applied, the controller 36 is moved to one or the other of its various application positions. Assuming that it is moved to its first application position, where the drum 37 bridges the two contacts 38 only, current will be supplied from the battery 43 to the two windings A only, these two windings being illustrated as the extreme end windings to the track brake device. This circuit includes, beginning from battery 43, contact fingers 38 and drum contact 37, conductors 44 and 45, which lead in parallel to the two windings A, and return conductors 46 and 47 which likewise lead in parallel back to the battery 43. The two windings A will thus be energized in parallel and as a result will cause a magnetic flux to be established in the space between the two rail-engaging shoes 14 and the track rail, as well as in the space between the two shoes alone.

When the track brake device is in its raised position, the distance of the rail-engaging shoes 14 above the track rail 12 is greater than the gap formed at 35 between the left hand end of the plunger 30 and the left hand rail-engaging shoe 14. A large portion of the flux will therefore travel across the gap 35 and cause the plunger 30 to be actuated to the left. As a result, the two contacts 24 and 25 will engage the contact 21.

Engagement of the contact 24 with the contact 21 connects the track brake winding E between the supply conductor 45 and the return conductor 47, by way of conductors 23, contacts 21 and 24, conductors 48 and 49, winding E, and conductor 50; while engagement of the contact 25 with the contact 21 in a like manner connects the winding B to the supply conductor 45 and the return conductor 47, by way of conductor 23, contacts 21 and 25, conductors 51 and 52, winding B, and conductor 53. Thus while the position of the controller assumed would normally energize only the windings A, the switch mechanism 20 functions to also connect in circuit the windings B and E. The additional magnetism produced as a result of energization of the windings B and E will insure that the magnetic track brake device will be promptly attracted to engagement with the track rail 12, even though the distance of the rail-engaging shoes 14 above the track rail 12 is abnormally large.

As the rail-engaging shoes 14 approach the track rail, the reluctance of the magnetic path which includes the track rail decreases and more and more of the flux which initially passed through the plunger 30 will pass down through the track rail. This will be obvious since the plunger 30 has only a small area and cannot carry more than a very small portion of the total flux produced between the two rail-engaging shoes. When the rail-engaging shoes are almost in contact with the track rail, the flux passing through the plunger 30 will have reduced to a value such that the spring 34 will shift the plunger to the right hand position shown in Fig. 2. This will disengage contacts 24 and 25 from the contact 21, thus deenergizing the windings B and E for the position of the controller 36 assumed. The energization of the windings A will, however, be sufficient to hold the track brake device in engagement with the track rail. Thus the minimum degree of braking only will be produced.

If now it is assumed that the controller 36 is moved to the second application position, where the drum 37 engages the contact 39, it will be seen that the windings A and B will be energized. If the controller is moved to the third application position, where the contact drum 37 engages the contact 40, the additional winding C will be energized. In the fourth position of the controller the additional winding D will be energized. In the last position of the controller the winding E also will be energized.

It will be apparent that regardless of the position to which the controller is initially moved, the switch mechanism 20 will always function as soon as any of the windings are energized to cause the contacts 24 and 25 to engage the contact 21, to insure that windings B and E will be energized. Of course, if either of these windings are initially energized by operation of the controller, the switch mechanism merely functions as an ancillary energizing means with respect to that one winding.

However, in a great majority of instances the operator will move the controller to either the first or second position, as he will in general desire a low degree of braking initially so as to avoid undue shock, in which event the switch mechanism 20 will function to insure that the track brake device will be promptly attracted to the rail, and before engagement with the rail will deenergize the windings B and E if these are not maintained energized due to the position of the controller.

While I have illustrated my invention with particular reference to one embodiment thereof, it is not my intention to be limited to the exact details of this embodiment, nor otherwise than by the spirit and scope of the appended claims.

Having now described my invention, what I claim as new and desire to secure by Letters Patent, is:

1. In a magnetic track brake system, in combination, a magnetic track brake device having a plurality of energizable windings, means for initially energizing one or more of said windings, and means operated as a result of the magnetism produced by said one or more windings for effecting the energization of other of said windings.

2. In a magnetic track brake system, in combination, a magnetic track brake device, means for suspending said magnetic track brake device above a track rail, means for establishing in said brake device a minimum degree of magnetic flux to cause a minimum degree of magnetic attraction between said brake device and said rail, and means operating responsive to said minimum magnetic flux for increasing the degree of attraction of said brake device for said rail.

3. In a magnetic track brake system, in combination, a magnetic track brake device, means for producing in said magnetic track brake device a chosen degree of magnetism, and means responsive to the magnetism produced in said track brake device for effecting an increase of the degree of magnetism above said chosen degree.

4. In a magnetic track brake system, in combination, a magnetic track brake device having a plurality of windings, means for suspending said magnetic track brake device above a track rail, means for energizing at least one of said windings to establish a magnetic flux in said track brake device, and a switch mechanism operating responsive to said magnetic flux for effecting the energization of additional of said windings, whereby said magnetic track brake device is promptly attracted toward said track rail, said switch mechanism operating slightly prior to engagement of said track brake device with said rail to deenergize said additional windings.

5. In a magnetic track brake system, in combination, a magnetic track brake device, means for supplying current to said magnetic track brake device to a chosen degree to cause said magnetic track brake device to be attracted toward engagement with a track rail, and means operating responsive to said energization of said track brake device to increase the degree of energization thereof to cause said track brake device to move more promptly toward engagement with said rail, said last means being operative just prior to engagement of said track brake device with said rail to decrease the energization thereof to the degree initially effected.

6. In a magnetic track brake system, in combination, a magnetic track brake device having a plurality of energizable windings, means for suspending said magnetic track brake device above a track rail, means for manually effecting the energization of at least one of said windings, and a switch mechanism operated in response to energization of said one winding for effecting the energization of additional of said windings, and operative as said track brake device approaches close to said track rail for effecting the deenergization of said additional windings.

7. In a magnetic track brake system, in combination, a magnetic track brake device having a plurality of separate energizable windings, means for suspending said magnetic track brake device suspended above a track rail, a manually operated controller device for selectively energizing said windings, said controller device being operative in one position to energize a minimum number of said windings, and a switch mechanism operative as a result of energizing said minimum number of said windings for effecting the energization of an additional one of said windings, and operative as said track brake device approaches said track rail to effect the deenergization of said additional winding.

8. In a magnetic track brake system, in combination, a magnetic track brake device having a plurality of separate energizable windings, spring means for suspending said track brake device suspended above a track rail, a manually operable controller device operable in a first application position to energize a minimum number of said windings, and operable as it is progressively moved to other application positions to progressively energize the other of said windings, and a switch mechanism carried by said track brake device and responsive to at least the energization of said minimum number of said windings to effect the energization of an additional number of said windings, and operative as said track brake device approaches closely to engagement with the track rail to deenergize said additional windings.

9. In a magnetic track brake device, a pair of rail-engaging shoes, a plurality of energizing windings each of which upon energization thereof is adapted to produce a magnetic flux passing from one of said rail-engaging shoes to the other, and a switch mechanism having a set of contacts operated as a result of the magnetic flux produced by energization of one of said windings to establish a circuit for energizing additional ones of said windings, said switch mechanism being operative upon a decrease of the magnetic flux passing between said rail-engaging shoes to deenergize said additional windings.

10. In a magnetic track brake device, in combination, a pair of rail-engaging shoes, a plurality of separate energizable windings each of which is adapted upon energization thereof to produce a magnetic flux passing from one of said rail-engaging shoes to the other, and a switch mechanism operated as a result of the magnetic flux produced between said rail-engaging shoes due to energization of one of said windings for effecting the energization of other of said windings.

BURTON S. AIKMAN.